United States Patent
Apte et al.

(10) Patent No.: US 8,954,419 B2
(45) Date of Patent: Feb. 10, 2015

(54) METHOD FOR SERIAL AND CONDITION-BASED EXECUTION OF OPERATORS BY PARALLEL PROCESSES

(75) Inventors: Himani Apte, Mountain View, CA (US); Thierry Cruanes, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 13/478,065

(22) Filed: May 22, 2012

(65) Prior Publication Data

US 2013/0318068 A1  Nov. 28, 2013

(51) Int. Cl.
*G06F 17/30* (2006.01)
*G06F 15/16* (2006.01)

(52) U.S. Cl.
CPC .......... *G06F 17/30445* (2013.01); *G06F 15/16* (2013.01)
USPC ..... 707/718; 707/764; 707/803; 707/E17.017

(58) Field of Classification Search
CPC ............... G06F 17/30445; G06F 17/30442; G06F 17/3056; G06F 17/30463; G06F 17/3008; G06F 9/5066; G06F 9/5005; G06F 17/30; G06F 9/46; G06F 15/16; G06F 17/30513
USPC .......... 707/764, 718, 719, 713, 623, E17.017, 707/E17.131, 803, 809, 64, 96, 636; 709/200, 205, 206
See application file for complete search history.

(56) References Cited

U.S. PATENT DOCUMENTS

| | | | | |
|---|---|---|---|---|
| 5,857,180 | A  * | 1/1999 | Hallmark et al. | 707/796 |
| 7,203,672 | B2 * | 4/2007 | Cruanes et al. | 707/999.002 |
| 7,293,011 | B1 * | 11/2007 | Bedi et al. | 707/999.002 |
| 7,739,233 | B1 * | 6/2010 | Ghemawat et al. | 707/610 |
| RE42,664 | E  * | 8/2011 | Hallmark et al. | 707/636 |
| 7,991,794 | B2 * | 8/2011 | Bedi et al. | 707/796 |
| 8,135,980 | B2 * | 3/2012 | Dodgson et al. | 714/4.2 |
| 8,315,980 | B2 * | 11/2012 | Ghosh et al. | 707/623 |
| 2005/0131877 | A1 * | 6/2005 | Ghosh et al. | 707/3 |
| 2005/0131879 | A1 * | 6/2005 | Ghosh et al. | 707/3 |
| 2005/0131881 | A1 * | 6/2005 | Ghosh et al. | 707/3 |

(Continued)

OTHER PUBLICATIONS

Baru et al.—"DB2 Parallel Edition"—Published in: IBM Systems Journal (vol. 34 , Issue: 2 ); Date of Publication: 1995 pp. 292-322—ISSN : 0018-8670—DOI:10.1147/sj.342.0292.*

(Continued)

*Primary Examiner* — Anh Ly
(74) *Attorney, Agent, or Firm* — Hickman Palermo Truong Becker Bingham Wong LLP

(57) ABSTRACT

Techniques are provided for improving performance of parallel execution plans that include serial operations. A database server generates a parallel execution plan and includes one or more serial data flow objects in the parallel execution plan, each data flow object including one or more serial row sources. A parallel selector row source is associated with each serial data flow object included in the parallel execution plan. Each parallel selector row source coordinates with a query coordinator process the execution of the associated serial data flow object. In the event that that a plurality of serial data flow objects are included in a parallel execution plan, serial row sources included in the serial data flow objects may be executed concurrently by a separate parallel slave process, instead of sequential execution of each serial row source by the query coordinator process.

12 Claims, 3 Drawing Sheets

(56) References Cited

U.S. PATENT DOCUMENTS

| | | | |
|---|---|---|---|
| 2005/0131890 A1* | 6/2005 | Cruanes et al. | 707/4 |
| 2005/0132383 A1* | 6/2005 | Ghosh et al. | 719/312 |
| 2006/0190947 A1* | 8/2006 | Ghosh et al. | 719/313 |
| 2006/0218123 A1* | 9/2006 | Chowdhuri et al. | 707/2 |
| 2009/0077094 A1* | 3/2009 | Bodain | 707/E17.009 |
| 2009/0151623 A1* | 6/2009 | Enicks | 117/94 |
| 2010/0312762 A1* | 12/2010 | Yan et al. | 707/716 |
| 2011/0060731 A1* | 3/2011 | Al-Omari et al. | 707/718 |
| 2011/0125730 A1* | 5/2011 | Bordawekar et al. | 707/718 |
| 2011/0154338 A1* | 6/2011 | Ramanathaiah et al. | 718/100 |
| 2011/0219208 A1* | 9/2011 | Asaad et al. | 712/12 |
| 2013/0081024 A1* | 3/2013 | Urhan | 718/100 |

OTHER PUBLICATIONS

Cruanes et al.—"Parallel SQL execution in Oracle 10g"—Proceeding SIGMOD '04 Proceedings of the 2004 ACM SIGMOD international conference on Management of data—Jun. 13-18, 2004, Paris, France—pp. 850-854.*

* cited by examiner

METHOD FOR SERIAL AND CONDITION-BASED EXECUTION OF OPERATORS BY PARALLEL PROCESSES

FIELD OF THE INVENTION

The present invention relates to database systems, and in particular, to optimization of queries executed by a database system.

BACKGROUND

Relational and object-relational database management systems store information in tables of rows in a database. To retrieve data, queries that request data are submitted to a database server, which computes the queries and returns the data requested.

Query statements submitted to the database server should conform to the syntactical rules of a particular query language. One popular query language, known as the Structured Query Language (SQL), provides users a variety of ways to specify information to be retrieved.

A query submitted to a database server is evaluated by a query optimizer. Based on the evaluation, the query optimizer generates an execution plan that defines operations for executing the query. Typically, the query optimizer generates an execution plan optimized for efficient execution. The execution plan includes individual steps, or row sources, each of which produces a row set.

Parallel Execution of a Query

Each operation of an execution plan may be executed by a database server either sequentially or in parallel. Sequential execution of an operation uses one process and one storage device at a time to execute the operation. In contrast, parallel execution of query operations uses multiple resources to execute, in parallel, subtasks of parallel operations in a query execution plan. Thus, part of the query optimization process may include the database server determining whether execution of one or more operations of the query execution plan may be made more efficient by parallel execution. Example database operations that are capable of parallel execution include scanning the rows of a database table, performing join operations, and sorting operations. The parallel execution of such operations may reduce the total execution time of a query by using multiple resources to execute the subtasks of the operations concurrently while respecting the semantics of the operations.

In one arrangement, a database may manage the parallel execution of one or more operations of a query execution plan using a query coordinator process and multiple parallel slave processes. Among other tasks, the query coordinator process examines each parallel operation in an execution plan and determines how the rows operated on by each parallel operation should be divided or redistributed among the parallel slave processes. The parallel slave processes then execute the parallel operation subtasks assigned by the query coordinator.

An execution plan optimized for parallel execution typically includes both parallel row sources and row sources that are executed sequentially, referred to as serial row sources. Particular row sources in an execution plan may need to be executed sequentially for a number of reasons including the nature of the operation or the characteristics of the data being accessed by the operation are not suitable for parallel execution. For example, row sources that access a remote database, access data designated for serial access, or are otherwise not capable of parallelization are executed as serial row sources.

Described herein are techniques for efficiently computing execution plans that include both parallel row sources and serial row sources.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
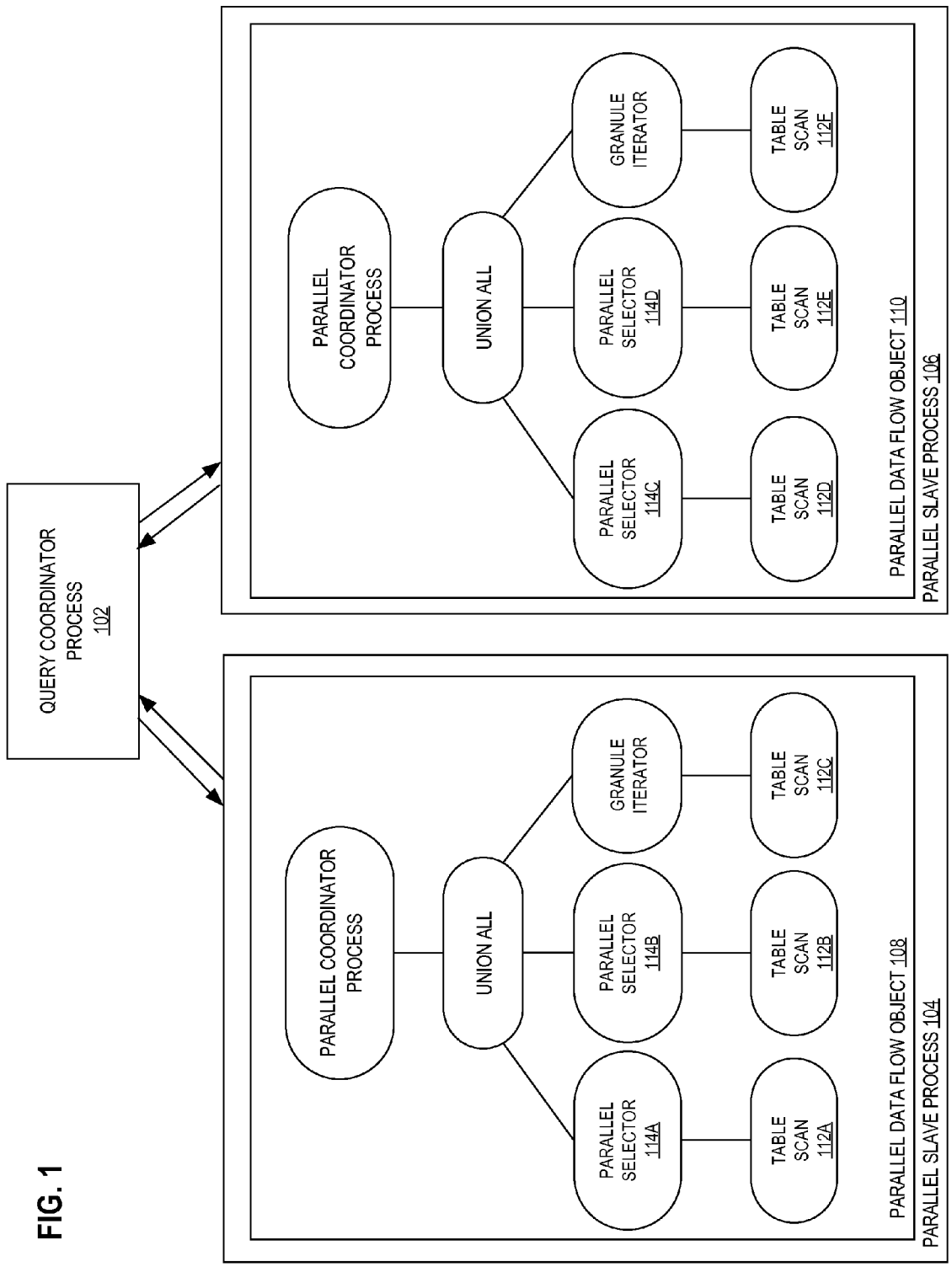
FIG. 1 is an block chart illustrating an example system for the execution of serial row sources in a parallel execution plan.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

The approaches described herein provide an efficient way for a database server to process parallel execution plans that include serial row sources. A database server receives a query statement and generates a query execution plan comprising one or more row sources. In one implementation, the database server determines whether one or more of the row sources in the query execution plan should be executed in parallel. In response to the database server determining that one or more of the row sources should be executed in parallel, a query coordinator process obtains a plurality of parallel slave processes in order to execute the parallel row sources.

Based on determining that one or more of the row sources in the query execution plan should be executed in parallel, the query coordinator generates a parallel execution plan. The parallel execution plan generated by the query coordinator is further subdivided into sub-plans referred to as a parallel data flow object. Each parallel data flow object is executed by a particular set of parallel slave processes of the obtained parallel slave processes. The parallel slave processes of a particular set of parallel slave processes each receive a copy of the same parallel data flow object including the same row sources.

A query execution plan may include both parallel row sources and serial row sources. For an execution plan that includes both serial row sources and parallel row sources, the parallel row sources are executed by the obtained multiple parallel slave processes and the serial row sources may be executed by the query coordinator process. In this arrangement, parallel slave processes that depend on the output from one or more of the serial row sources executed by the query coordinator process may often be idle while the query coordinator process executes the serial row sources. For query execution plans that include a large number of serial row sources or include serial row sources that operate on large data sets, reliance on the query coordinator process to execute all serial row sources may counteract the efficiency gains from the parallel execution of parallel row sources in the query execution plan.

In an embodiment, one or more serial data flow objects are included in a parallel execution plan for execution on the plurality of parallel slave processes. Each serial data flow object includes one or more serial row sources. However, unlike parallelized database operations, the operations represented by the serial row sources are not divided into subtasks for execution among a number of separate parallel slave processes. Instead, each serial data flow object included in the parallel execution plan may be received by multiple parallel slave processes, but the row sources included in the serial data flow object generally should be executed only once by a single parallel slave process. Thus, the execution of each serial row source of a serial data flow object included in a parallel execution plan is coordinated to ensure that the serial row source is executed the appropriate number of times and by the appropriate number of parallel slave processes.

In one embodiment, a new row source, referred to as a parallel selector row source, is included in a parallel execution plan that includes one or more serial data flow objects. Each of the serial data flow objects included in the parallel execution plan is associated with a parallel selector row source. A parallel selector row source coordinates with the query coordinator process execution of the serial row sources included in the associated serial data flow object. The parallel selector row source enables the database server to coordinate the execution of serial row sources among a plurality of parallel slave processes without the need for modification to the underlying serial row sources. Additionally, in the event that multiple serial data flow objects are included in a parallel execution plan, coordination by the parallel selector row sources enables the concurrent execution of the serial row sources included in the serial data flow object on the plurality of parallel slave processes.

The execution of serial data flow objects by one or more parallel slave processes instead of the query coordinator provides a number of advantages. Instead of the query coordinator sequentially executing each serial row source of an execution plan, execution of serial data flow objects by parallel slave processes enables the concurrent execution of certain serial row sources. Furthermore, by moving the execution of serial data flow objects from the query coordinator to parallel slave processes enables the query coordinator process to perform tasks related to query execution coordination and scheduling more efficiently.

Illustrative Implementation

For the purposes of illustration, assume that a database server receives the example query statement (QS1):

SELECT*FROM remote_table1 UNION ALL
SELECT*FROM remote_table2 UNION ALL
SELECT*FROM local_table;

The example query statement QS1 includes three SELECT queries that each retrieves all rows from the tables remote_table1, remote_table2, and local_table, respectively. The resulting rows from each SELECT query are combined with the rows from the other two SELECT queries by the two UNION ALL clauses, resulting in a single result set that returns all rows from each of the three tables. Each of tables remote_table1 and remote_table2 represents a database table located at a remote data source and may be located on the same or separate remote servers. The database table local_table represents a database table local to the database server and does not require a remote database link to access.

In order to execute the query statement QS1, a database server generates a query execution plan including one or more row sources. For example, a query execution plan generated for the query statement QS1 may include, among other row sources, table scan row sources that access each of the three tables identified in the query, and a row source that performs the union all operation combining the result from each of the table scan row sources.

A database server performs an analysis in order to determine whether one or more of the execution plan row sources generated for the query statement QS1 may be executed in parallel. The parallel execution analysis may take into account factors including the type of operations performed by the row sources and the type and amount of data accessed by the row sources. For example, in reference to query statement QS1, a database server may determine that the table scan row source that accesses local_table 1 should be executed in parallel because a table scan performed on a local table is a parallelizable operation, and the amount of data accessed in local_table is large enough to make parallel execution of the row source more efficient than sequential execution.

Based on the determination that one or more row sources of the query execution plan should be executed in parallel, a query coordinator process generates a parallel execution plan. The row sources in the query execution plan that are determined to be unsuitable for parallel execution are designated as serial row sources. The serial row sources form one or more serial data flow objects, each serial data flow object representing a combination of one or more serial row sources. For example, referring to query statement QS1, the database server may determine that the row sources accessing each of the remote tables remote_table1 and remote_table2 are to be executed sequentially. The determination that particular operations are unsuitable for parallel execution may be made, for example, because the database server is not capable of executing an operation in parallel, because the operations have been marked in the query for serial execution, or based on other constraints.

In addition to local database table scans, a database server may parallelize a union-all row source if one or more of its input row sources are parallel row sources. For example, in reference to an execution plan generated for query statement QS1, the union all row source has three input row sources, one for each of the row sources accessing one of the three tables identified in the query statement. As described above, a database server may determine that the row source implementing the table scan on the local table is to be executed in parallel, and the row sources implementing the remote table scans are to be executed sequentially. Thus, a database server may determine that the row source implementing the union all operation should be executed in parallel because the input row source for accessing local_table is a parallel row source. The example query execution plan for query statement QS1 described above illustrates an execution plan that includes both serial row sources (e.g., the remote table scan row sources) and parallel row sources (e.g., the union all and local table scan row sources).

FIG. 1 is a block diagram of a system for execution of a parallel execution plan that includes both parallel row sources and serial row sources, according to an embodiment of the invention. Referring to FIG. 1, the system includes a query coordinator process 102 that is in communication with parallel slave process 104 and parallel slave process 106. Query coordinator process 102 generally represents the process responsible for coordinating execution of a parallel execution plan generated for a received query statement.

In order to execute a parallel execution plan, a query coordinator process obtains a plurality parallel slave processes from a global pool of available slave processes. The system in FIG. 1 includes only two slave processes for illustration purposes only, and in other embodiments, the system may include any number of parallel slave processes. In the illustrated system, execution of a parallel execution plan that includes both parallel and serial row sources, such as the example parallel execution plan described above for query statement QS1, involves assigning a parallel data flow object 108 and 110 to each of parallel slave processes 104 and 106, respectively. Each of parallel data flow objects 108 and 110 represents a sub-plan of the parallel execution plan generated by the query coordinator process 102. Additionally, a serial data flow object (not shown) is executed by the query coordinator process. Parallel data flow objects 108 and 110 include a copy of the same sub-plan containing the same row sources and query coordinator process 102 provides additional information to each parallel slave process instructing the parallel slave process to execute certain portions of the parallel data flow object.

In an embodiment, a database server identifies in a query execution plan one or more serial data flow objects, each serial data flow object including one or more serial row sources, capable of execution by a parallel slave process. In response to identifying the one or more serial data flow objects, the database server includes the serial data flow objects in a parallel execution plan to be executed by the parallel slave processes, instead of by the query coordinator process. For example, referring to an example execution plan for query statement QS1, a database server may determine that the serial row source implementing the remote table scan on remote_table1 is capable of execution by a parallel slave process. A serial data flow object that includes the remote table scan row source is then included in the parallel execution plan, and consequently parallel data flow objects 108 and 110.

Parallel Selector Row Source

In an embodiment, a parallel selector row source is included in a parallel execution plan in association with each serial data flow object included in the plan. The parallel selector row source coordinates the execution of the associated serial data flow object by communicating with the query coordinator process to ensure that one or more serial row sources included in the serial data flow object are properly executed. The parallel selector row source row output will correspond to the row output of the associated serial data flow object.

For example, the serial row sources implementing the remote table scans in the execution plan for query statement QS1 represent operations that should be executed only once by a single process. However, the serial data flow objects that includes the serial row sources implementing the remote table scans may be received by any number of parallel slave processes as part of the same parallel execution plan. Each parallel selector row source associated with a serial data flow object that includes a remote table scan row source coordinates with the query coordinator process to ensure that the remote table scan is executed by only a single slave process.

The query coordinator process maintains one or more global conditions associated with each serial operation included in a parallel execution plan. The parallel selector row source checks the global conditions associated with a serial row source before a serial row source is executed by a parallel slave process. For example, a global condition associated with the remote table scan on remote_table1 may specify that the row source implementing the remote table scan should be executed only once by a single slave process. The condition may be checked each time a parallel slave process executes a parallel selector row source associated with a serial data flow object that includes a serial row source implementing the remote table scan on remote_table 1.

In another embodiment, global conditions other than execution by a single parallel slave process may be associated with a serial row source executed by a parallel slave process. For example, a global condition may indicate that an operation is to be executed by two or more parallel slave processes, that an operation is to be executed multiple times by a single slave process, or any other condition that may be checked by the query coordinator process.

Parallel Selector Row Source Execution

Parallel data flow objects 108 and 110 are illustrated as including a number of row sources, including multiple parallel selector row sources, as part of an example parallel execution plan for query statement QS1. One method of representing a query execution plan is a row source tree. At execution, traversal of a row source tree from the bottom up yields a sequence of steps for performing the operations specified by the SQL statement. A row source tree is composed of row sources. During the compilation process, row sources are allocated, and each row source is linked to zero, one, two, or more underlying row sources. The makeup of the row source tree depends on the query and the decisions made by a query optimizer during the compilation process. Typically, a row source tree is comprised of multiple levels. At the lowest level, the leaf nodes access rows from a database or other data store. The top row source, the root of the tree, produces the rows of the query that the tree implements. The intermediate levels perform various transformations on rows produced by underlying row sources.

In an embodiment, each parallel slave process executes a parallel data flow object in a top-down fashion, with each parent row source opening and fetching from its child row sources and the rows flow from the bottom-up the iterator tree. Thus, at the bottom of the row source tree illustrated in parallel data flow objects 108 and 110 are a set of table scan row sources 112A-F that each implement a table scan on one of the three tables specified in the query statement QS1. Table scan row sources 112A and 112D implement the table scan operation on table remote_table1, representing a serial operation that should be executed by only one of the parallel slave processes. In other words, during execution of the parallel data flow objects 108 and 110 by parallel slave processes 104 and 106, either table scan row source 112A or 112D should be executed, but not both. Similarly, table scan row sources 112B and 112E implement the remote table scan operation on table remote_table2. In contrast, table scan row sources 112C and 112F represent the table scan operation performed on local_table and both row sources are executed in parallel with other slave processes. The example table scan row sources 112A and 112D represent serial data flow objects that include only a single serial row source, however, other serial data flow objects may include any combination and number of serial row sources.

During execution of parallel data flow object 108, parallel slave process 104 executes parallel selector row source 114A. Parallel selector row source 114A is associated with table scan row source 112A, which implements the remote table scan operation on remote_table1.

Execution of parallel selector row source 114A by parallel slave process 104 causes parallel slave process 104 to send a control message to query coordinator process 102 requesting to execute serial table scan row source 112A. In response to receiving the control message from parallel slave process 104 requesting to execute serial table scan row source 112A, query coordinator process 102 checks one or more global conditions associated with table scan row source 112A. For example, as described above, a global condition may be associated with table scan row source 112A specifying that the corresponding remote table scan operation should be executed by only one parallel slave process. Thus, query coordinator process 102 checks the global condition associated with the serial table scan operation in order to determine whether the serial table scan operation has been previously executed by another parallel slave process. If the serial table scan operation has not been previously executed by another parallel slave process, the query coordinator process 102 assigns the serial table scan operation for execution by sending a control message to parallel slave process 104 indicating that parallel slave process 104 should execute table scan row source 112A.

If the global condition indicates that query coordinator process 102 has previously assigned the serial table scan operation to another parallel slave process, query coordinator process 102 sends a negative response to parallel slave process 104 indicating that it should not execute table scan row source 112A. After either receiving a positive response from query coordinator process 102 and executing table scan row source 112A or receiving a negative response indicating that parallel slave process 104 should not execute table scan row source 112A, parallel slave process 104 proceeds to execute parallel selector row source 114B in similar fashion.

Similarly, parallel slave process 106 executes parallel data flow object 110 concurrently with the execution of parallel data flow object 108 by parallel slave process 104. During execution of parallel data flow object 110, parallel slave process 106 executes parallel selector row source 114C causing parallel slave process 106 to send a control message to query coordinator process 102 requesting to execute serial table scan row source 112D. In response to receiving the control message from parallel slave process 106, query coordinator process 102 determines whether to assign serial table scan row source 112D for execution to parallel slave process 106. Assuming that query coordinator process 102 has previously assigned serial table scan row source 112A to parallel slave process 104, query coordinator process 102 will respond in the negative, indicating that parallel slave process 106 should not execute table scan row source 112D.

In response to receiving a negative response from query coordinator process 102, parallel slave process 106 continues iterating through the remaining row sources in parallel data flow object 110. Accordingly, parallel slave process 106 executes parallel selector row source 114D, causing parallel slave process 106 to send a control message requesting assignment of serial table scan row source 112E for execution. In the example, the serial table scan row source 112E corresponds to the remote table scan operation on remote_table2. Assuming that query coordinator process 102 has not previously assigned the serial table scan operation on remote_table2 for execution, query coordinator process 102 assigns table scan row source 112E to parallel slave process 106 for execution.

Table scan row sources 112C and 112F correspond to the parallel table scan performed on local_table, and are executed in parallel on the two slave processes. Because parallel table scan row sources 112C and 112F represent a parallelized operation that has been divided into subtasks for each parallel slave process, the parallel slave processes 104 and 106 do not need to request assignment of the parallel table scan row sources 112C and 112F. Consequently, according to the example, parallel slave process 104 may execute serial table scan row source 112A and parallel table scan row source 112C, and parallel slave process 106 may execute serial table scan row source 112E and parallel row source 112F. In this way, the two serial table scan operations execute concurrently among the slave processes, rather than sequentially by the query coordinator process if they were included in the serial data flow object.

Communication Protocol

In an embodiment, the parallel selector row sources and query coordinator process communicate using an inter-process communication protocol. For example, a Remote Procedure Call protocol may be defined in order to provide a mechanism for communication between the parallel slave process and the query coordinator process. In an embodiment, the parallel selector row source provides an implementation of a generic remote procedure call client that can be reused and extended for different types of row sources.

In response to receiving communication from a parallel selector row source executing on a parallel slave process, the query coordinator similarly communicates with the requesting parallel slave process using the inter-process communication protocol. As part of the communication protocol, the query coordinator process includes various state variables associated with communication with the parallel slave processes, such as variables that track the number of remote procedure calls expected from the parallel slave processes and the number of remote procedure calls received thus far.

Example Flow

Figure 2:
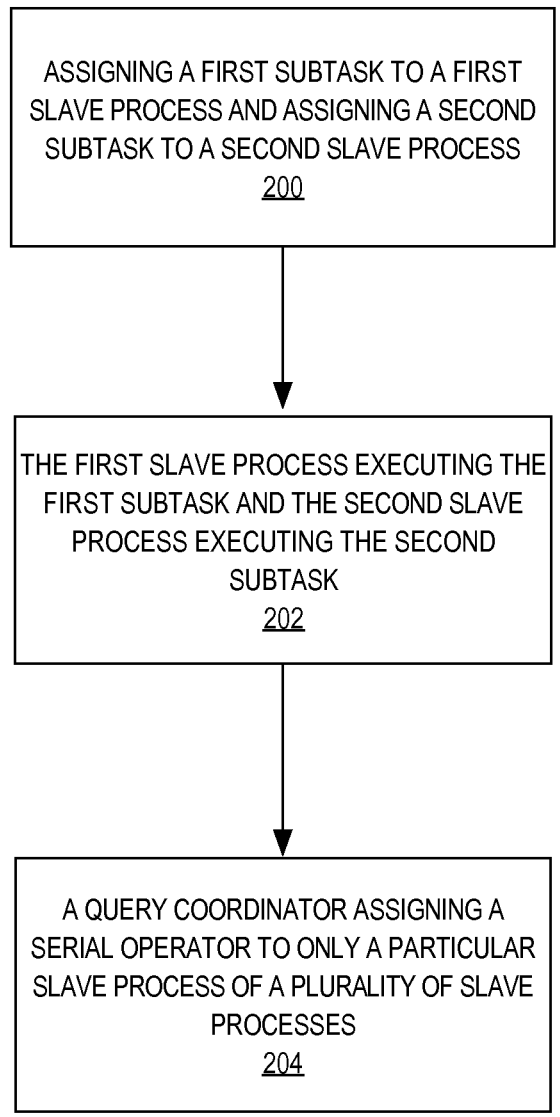
FIG. 2 is a flow diagram illustrating a process of executing a query statement including serial row sources.

FIG. 2 is a flow diagram that illustrates an example technique for parallel execution of a query execution plan that includes both parallel row sources and serial row sources. Alternative embodiments may include additional, fewer, or different steps than those illustrated in connection with FIG. 2.

In block 200, a query coordinator assigns a first subtask of a parallel row source to a first slave process and assigns a second subtask of the parallel row source to a second slave process. For example, the subtasks may be included in a parallel data flow object sent to the parallel slave processes, as described above. In block 202, the first slave process executes the first subtask and said second slave process executes the second subtask, resulting in parallel execution of the parallel row source.

In block 204, the query coordinator assigns a serial row source to only a particular slave process of a plurality of slave processes. For example, the query coordinator may assign the serial row source based on one or more global conditions associated with the serial operation. In response to assignment of a serial row source to a particular slave process, the slave process assigned the serial row source then executes the serial row source.

Database Systems

A database management system ("DBMS") manages a database. A database management system may comprise one or more database servers. A database comprises database data and metadata that is stored on a persistent memory mechanism, such as a set of hard disks. Database data may be stored in one or more data containers. Each container contains records. The data within each record is organized into one or more fields. In relational database management systems, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Database applications and clients interact with a database server by submitting to the database server commands that cause the database server to perform operations on data stored in a database. A database command may be in the form of a database statement that conforms to database language statement. A language for expressing the database requests is the Structured Query Language (SQL). There are many different versions of SQL, some versions are standard and some proprietary, and there are a variety of extensions. SQL data definition language ("DDL") instructions are issued to a database server to create or configure database objects, such as tables, views, or complex data types. SQL/XML is a common extension of SQL used when manipulating XML data in an object-relational database. Although the examples are described based on Oracle's SQL, the techniques provided herein are not restricted to any particular version of SQL.

A multi-node database management system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid. A grid is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients. A process is an allocation of memory, CPU time for executing software, and possibly other computer resources, the allocation being made by the operating system on the computer system on which the process is running. In the case of process for a database server, the process executes database server software.

Resources from multiple nodes in a multi-node database system can be allocated to running a particular database server's software. Each combination of the software and allocation of the resources from a node is a server that is referred to herein as a "server instance" or "instance".

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
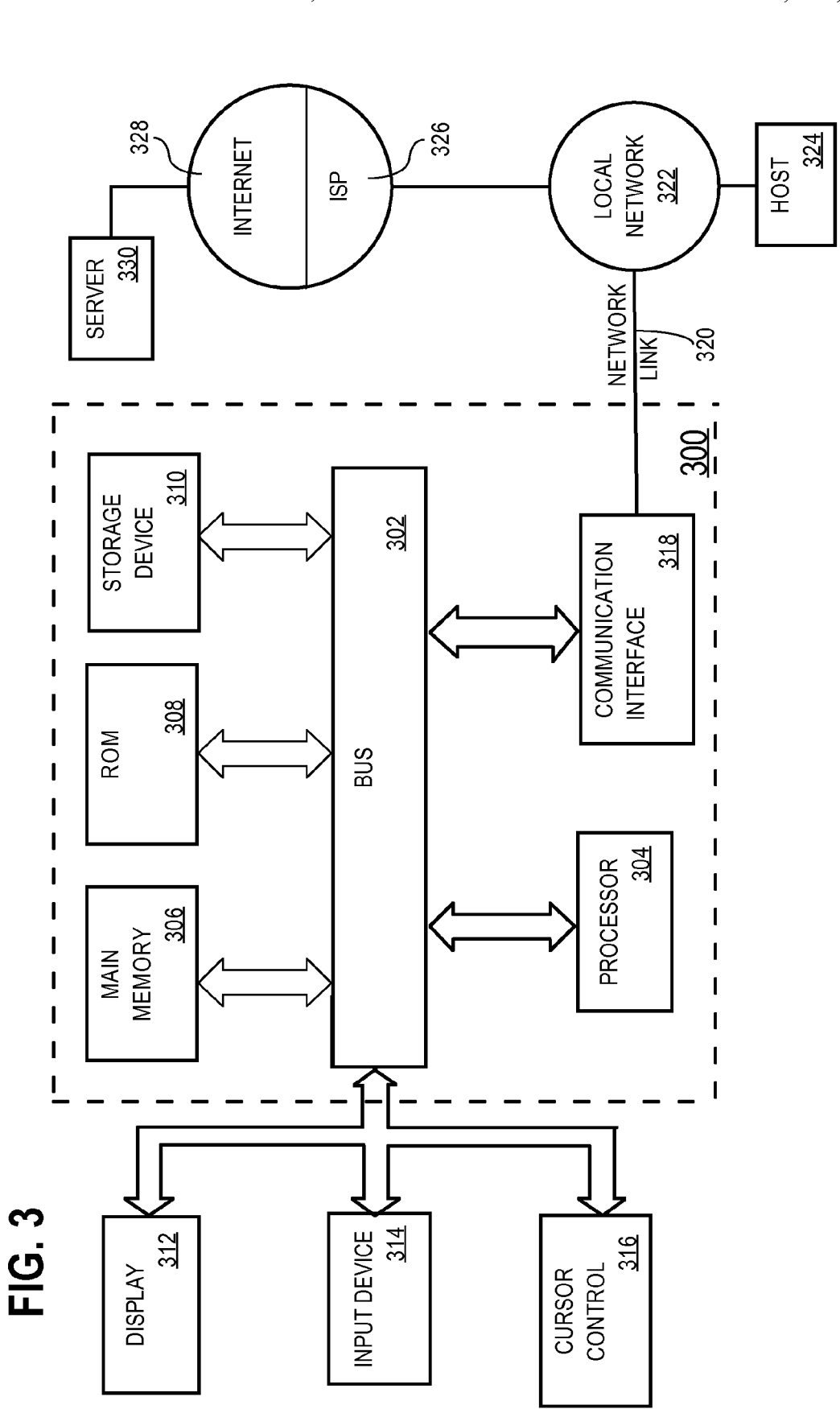
FIG. 3 is a block diagram that illustrates a computer system upon which an embodiment may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   a query coordinator and a plurality of slave processes executing a query execution plan that comprises (a) a parallel row source executed as multiple subtasks by multiple slave processes of said plurality of slave processes and (b) one or more serial row sources, wherein each serial row source of the one or more serial row sources is executed by only one slave process;
   wherein executing said query execution plan comprises:
      the query coordinator assigning a first subtask of said multiple subtasks to a first slave process of said multiple slave processes and assigning a second subtask of said multiple subtasks to a second slave process;
      said first slave process executing said first subtask and said second slave process executing said second subtask;
      a particular slave process of said plurality of slave processes sending, to said query coordinator, a request to execute a particular serial row source of said one or more serial row sources;
      in response to receiving said request to execute said particular serial row source, said query coordinator determining that said particular row source is not assigned to a slave process of said plurality of slave processes; and
      based on determining that said particular serial row source is not assigned to a slave process of said plurality of slave processes, said query coordinator assigning the particular serial row source of said one or more serial row sources to said particular slave process of said plurality of slave processes;
   wherein the method is performed by one or more computing devices.

2. The method of claim 1, further comprising:
   said second slave process of said plurality of slave processes sending, to said query coordinator, a request to execute said particular serial row source;
   in response to receiving said request to execute said particular serial row source of said one or more serial row sources, said query coordinator determining that said particular serial row source is assigned to said particular slave process;
   based on determining that said particular serial row source is assigned to said particular slave process, said query coordinator not assigning said particular serial row source to said second slave process.

3. The method of claim 1, wherein said request is based on a remote procedure call.

4. The method of claim 1, wherein said query execution plan includes a parallel selector row source, wherein said parallel selector row source causes said particular slave process to send said request to said query coordinator to execute said particular serial row source.

5. The method of claim 1, wherein said query execution plan is a query execution plan for a Structured Query Language (SQL) statement.

6. The method of claim 1, further comprising: in response to receiving said request to execute said particular serial row source of said one or more serial row sources, said query coordinator determining whether to assign said particular serial row source to said slave process based on one or more global conditions.

7. A non-transitory computer-readable medium storing instructions which, when executed by one or more processors, cause:
- a query coordinator and a plurality of slave processes executing a query execution plan that comprises (a) a parallel row source executed as multiple subtasks by multiple slave processes of said plurality of slave processes and (b) one or more serial row sources, wherein each serial row source of the one or more serial row sources is executed by only one slave process;
- wherein executing said query execution plan comprises:
    - the query coordinator assigning a first subtask of said multiple subtasks to a first slave process of said multiple slave processes and assigning a second subtask of said multiple subtasks to a second slave process;
    - said first slave process executing said first subtask and said second slave process executing said second subtask;
    - a particular slave process of said plurality of slave processes sending, to said query coordinator, a request to execute a particular serial row source of said one or more serial row sources;
    - in response to receiving said request to execute said particular serial row source, said query coordinator determining that said particular row source is not assigned to a slave process of said plurality of slave processes; and
    - based on determining that said particular serial row source is not assigned to a slave process of said plurality of slave processes, said query coordinator assigning the particular serial row source of said one or more serial row sources to said particular slave process of said plurality of slave processes.

8. The non-transitory computer-readable medium of claim 7, wherein the instructions further include instructions for:
- said second slave process of said plurality of slave processes sending, to said query coordinator, a request to execute said particular serial row source;
- in response to receiving said request to execute said particular serial row source of said one or more serial row sources, said query coordinator determining that said particular serial row source is assigned to said particular slave process;
- based on determining that said particular serial row source is assigned to said particular slave process, said query coordinator not assigning said particular serial row source to said second slave process.

9. The non-transitory computer-readable medium of claim 7, wherein said request is based on a remote procedure call.

10. The non-transitory computer-readable medium of claim 7, wherein said query execution plan includes a parallel selector row source, wherein said parallel selector row source causes said particular slave process to send said request to said query coordinator to execute said particular serial row source.

11. The non-transitory computer-readable medium of claim 7, wherein said query execution plan is a query execution plan for a Structured Query Language (SQL) statement.

12. The non-transitory computer-readable medium of claim 7, the instructions further comprising instructions for in response to receiving said request to execute said particular serial row source of said one or more serial row sources, said query coordinator determining whether to assign said particular serial row source to said slave process based on one or more global conditions.

* * * * *

UNITED STATES PATENT AND TRADEMARK OFFICE
CERTIFICATE OF CORRECTION

| | | |
|---|---|---|
| PATENT NO. | : 8,954,419 B2 | Page 1 of 1 |
| APPLICATION NO. | : 13/478065 | |
| DATED | : February 10, 2015 | |
| INVENTOR(S) | : Apte et al. | |

It is certified that error appears in the above-identified patent and that said Letters Patent is hereby corrected as shown below:

On Title page, in column 2, item (57) under Abstract, line 10, delete "that that" and insert -- that --, therefor.

Signed and Sealed this
Twenty-fourth Day of November, 2015

Michelle K. Lee
*Director of the United States Patent and Trademark Office*